Sept. 28, 1948.   O. J. LIDBERG   2,450,285
GLIDER SLED
Filed Oct. 25, 1946   2 Sheets-Sheet 1
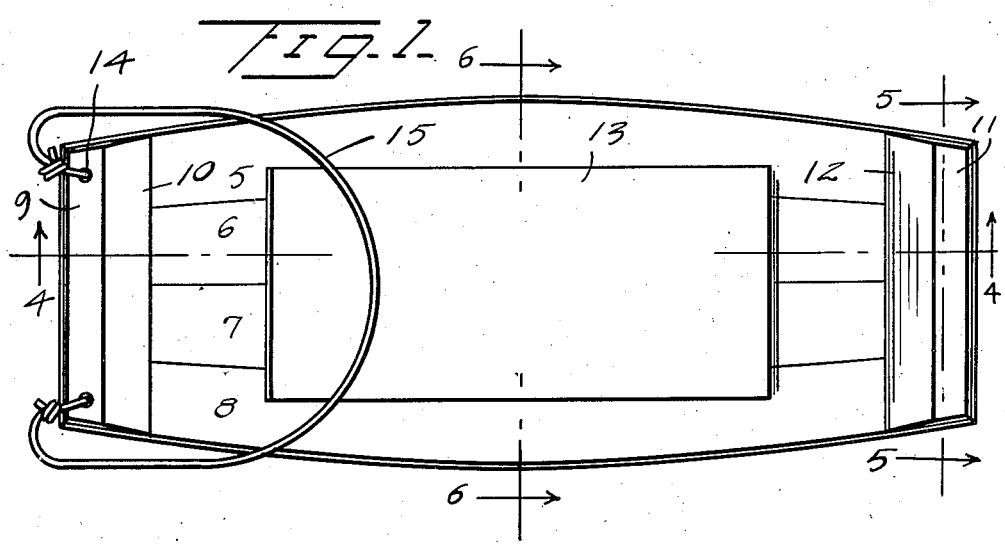
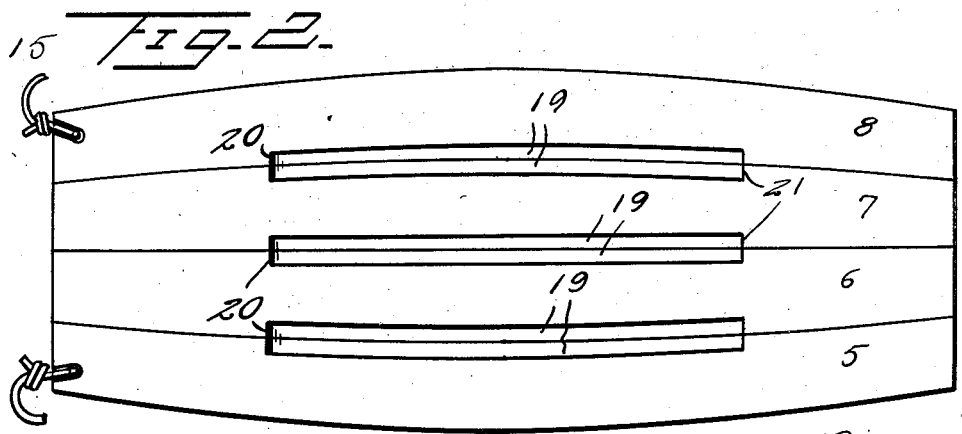
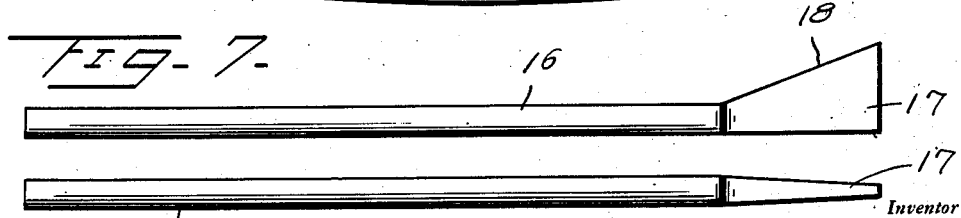
O. J. Lidberg
By Randolph & Beavers
Attorneys

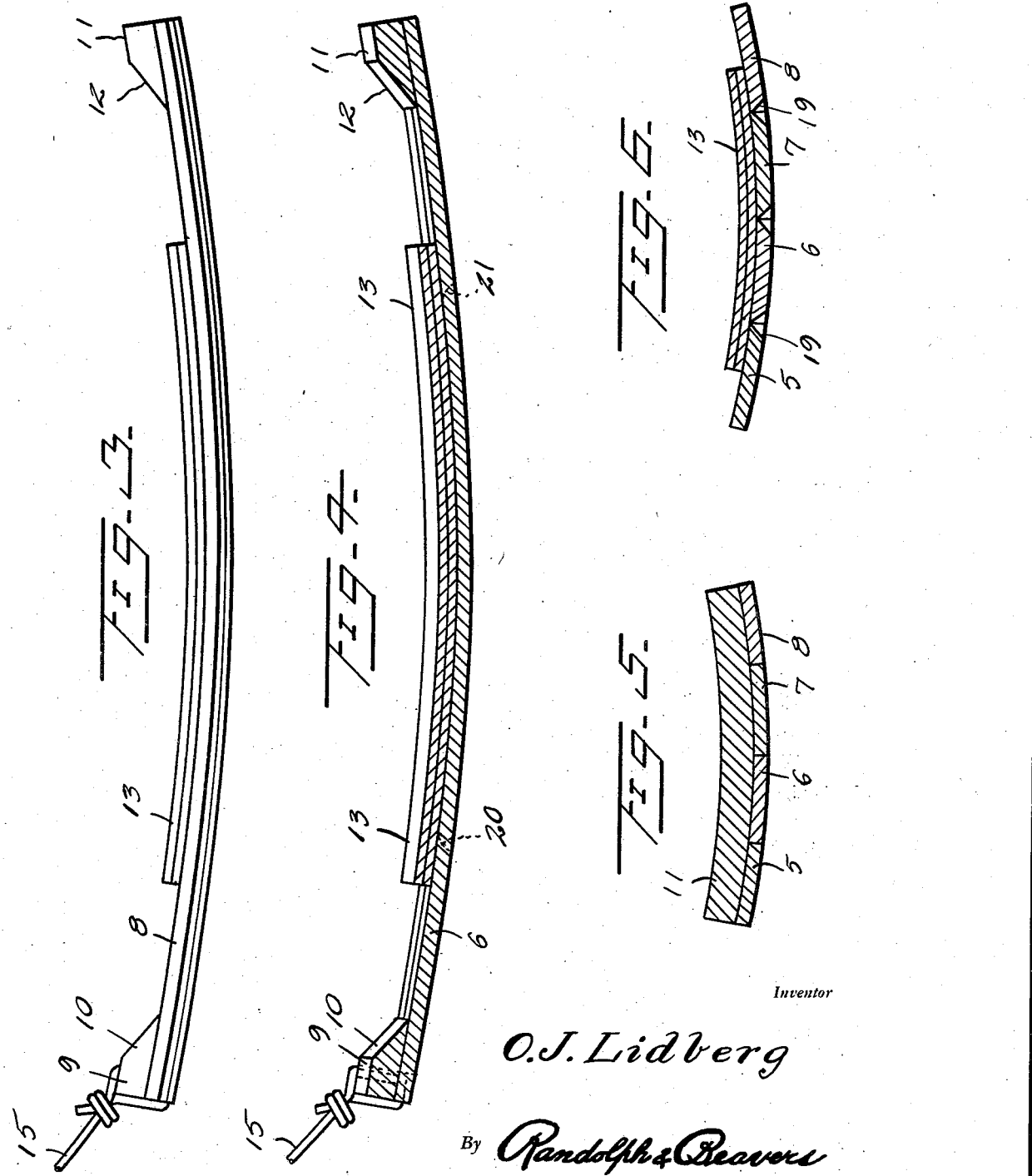

Patented Sept. 28, 1948

2,450,285

UNITED STATES PATENT OFFICE 2,450,285

GLIDER SLED

Oscar J. Lidberg, Hibbing, Minn.

Application October 25, 1946, Serial No. 705,655

1 Claim. (Cl. 280—18)

The present invention appertains to sleds or toboggans, such as may be used for coasting on hills covered by snow or ice and which may also be used for hauling materials or toting persons, especially children.

An important object of the invention is to provide a sled for coasting wherein the sled is of rigid construction and has an adjunct in the form of a steering stick which in use will permit steering of the sled or the maintenance of the sled on a straight line course.

Another object of the invention is to provide a sled construction which requires the exercise of balance and good form for its accurate use.

Still another object of the invention is to provide a sled of the character stated which can be manufactured and retailed at a low monetary figure, making the device available to practically all persons interested in the sport.

A further object of the invention is to provide a sled which is so formed as to permit the operator to perform various antics while gliding.

These and various other objects and advantages of the invention will become apparent to the reader of the following description.

In the drawings:

Figure 1 is a top plan view.

Figure 2 is a bottom plan view.

Figure 3 is a side elevation.

Figure 4 is a longitudinal sectional view taken on line 4—4 of Figure 1.

Figure 5 is a cross-section through the forward portion of the sled.

Figure 6 is a transverse section taken on line 6—6 of Figure 1.

Figure 7 is a side elevational view of the steering stick.

Figure 8 is a top plan view of the steering stick.

Referring to the drawings, numerals 5, 6, 7 and 8 denote elongated longitudinally and transversely curved slats, which when manufactured for this sled are of gradually tapering form from their intermediate portions toward their ends, in like construction to that of the common barrel stave.

The forward ends of the slats are nailed or otherwise secured to the bottom side of a forward transverse cleat 9, which is beveled at its inner longitudinal portion as at 10 to provide a sloping foot rest for one foot of the rider.

The rear ends of the slats are likewise bunched in edge to edge relation and nailed or otherwise secured to the underside of a rear transverse cleat 11, which has its inner longitudinal portion beveled as at 12 to provide a sloping foot rest for the other foot of the rider.

To reinforce the sled thus far described, a rectangular shaped plate 13 both transversely and longitudinally curved is suitably secured upon the medial portion of the sled as shown in Figure 1.

The forward ends of the end slats 5 and 8, as well as the opposite ends of the forward cleat 9, have openings 14 through which a rope or other flexible elongated element 15 has its end portions secured, this rope being used for pulling the sled and by the rider to brace himself when gliding down slopes.

In use with this sled is a guiding stick consisting of an elongated round member 16 having a flat head 17 at one end, flaring off to one side on an oblique, as at 18.

To assist in preventing any lateral slippage of the sled when riding over snow or ice, the opposed edge portions of the slats 5, 6, 7 and 8 are beveled, as at 19, from points 20 to 21. Due to the fact that the slats are curved, there is no opportunity for snow to cake in these thus formed grooves, the grooves forming tracks in the snow which serve to guide the sled on a straight course.

In the use and operation of the sled, the rider stands upon the slats 5, 6, 7 and 8 with his forward foot resting on the bevel 10 of the cleat 9 and his rearwardly disposed foot resting upon the bevel 12 of the rear cleat 11. He assists in balancing himself by holding the rope 15 and leaning rearwardly. The rope 15 is held by one hand while his other hand grips the stick 16 and by holding the head 17 upright in the snow behind the sled at a medial point of the rear cleat 11, the sled is steered on a substantially straight course. However, by pressing downwardly on the steering stick with the head 17 lying flatly in the snow and disposed off of one corner or the other of the cleat 11, the sled can be adequately steered to the right or left. Furthermore, by thus using the steering stick and shifting his weight on the sled, various movements and antics can be executed in gliding down a snow or ice covered slope.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A sled comprising a plurality of elongated slats, each of tapered construction from its medial portion outward, said slats being disposed in edge to edge relation, cleats securing the ends of the slats in said edge to edge relation, said slats having elongated medial portions of their abutting edges beveled to provide grooves at the bottom medial portion of said sled, while the end portions of the bottom side are smooth.

OSCAR J. LIDBERG.

REFERENCES CITED

The following references are of record in the file of this patent:

UNITED STATES PATENTS

| Number | Name | Date |
|---|---|---|
| 348,962 | Gentesse | Sept. 14, 1886 |
| 2,139,513 | Nelson et al. | Dec. 6, 1938 |
| 2,181,391 | Burgeson et al. | Nov. 28, 1939 |
| 2,195,553 | Bartlett | Apr. 2, 1940 |